(12) United States Patent
Ducret (10) Patent No.: US 6,662,450 B1
(45) Date of Patent: Dec. 16, 2003

(54) WIRE AND CABLE STRIPPER

(76) Inventor: Lucien C. Ducret, 6 Tod's Driftway, Old Greenwich, CT (US) 06870

( * ) Notice: Subject to any disclaimer, the term of this patent is extended or adjusted under 35 U.S.C. 154(b) by 0 days.

(21) Appl. No.: 09/374,691

(22) Filed: Aug. 16, 1999

(51) Int. Cl.[7] .............................................. B21F 13/00
(52) U.S. Cl. ...................................................... 30/90.4
(58) Field of Search ................................ 30/90.4, 90.7, 30/90.8, 90.9, 91.1, 91.2; 81/9.4

(56) References Cited

U.S. PATENT DOCUMENTS

| | | | |
|---|---|---|---|
| 3,535,785 A | * 10/1970 | Matthews | ................ 30/90.7 X |
| 4,955,137 A | 9/1990 | Matthews | |
| 5,201,254 A | 4/1993 | Davies | |
| 5,301,426 A | 4/1994 | Regan | |
| 5,337,479 A | 8/1994 | Ducret | |
| 5,491,894 A | 2/1996 | Bieganski | |
| 5,713,249 A | 2/1998 | Liversidge | |
| 5,809,652 A | 9/1998 | Ducret | |

* cited by examiner

Primary Examiner—Douglas D. Watts
(74) Attorney, Agent, or Firm—Yuri B. Kateshov, Esq.

(57) ABSTRACT

A tool manipulating device includes a combination of depth setting, length adjusting and workpiece clamp members provided on a longitudinal hand-held handle. The depth setting member has a blade assembly that extends perpendicular to the hand-held handle. The blade assembly is capable of rotating onto itself after penetrating into a workpiece to be stripped from its jacket at a predetermined depth to produce a ring cut and an axial cut of the workpiece upon sequentially rotating and axially pulling the cable relative to the handle.

34 Claims, 5 Drawing Sheets

WIRE AND CABLE STRIPPER

FIELD OF THE INVENTION

The present invention relates to wire and cable stripping tools. Particularly, the invention relates to hand tools for stripping jackets and insulation of electric and communication cables for subsequent electrical and fiber optic connections.

BACKGROUND OF THE INVENTION

There have been numerous designs of hand-held and operated wire and cable strippers, all of which aim at providing a tool which is easy to use, requires a relatively small operating force, and which can be manufactured relatively inexpensively, without greatly compromising functionality. One of the main features sought in these tools includes adjustment so as to suit different wire and cable diameters and insulation thickness.

One wire stripper is described in U.S. Pat. No. 5,491,894 (Bieganski) and has outer jaws adapted to grip a wire sheath and inner jaws adapted to cut into the sheath before the inner jaws are displaced along a cable relative to the outer jaws to strip a cut portion of the wire sheath. In order to vary a position of one inner jaw relative to its outer jaw so as to cope with different insulation thicknesses, the wire stripper is provided with an eccentric adjuster.

U.S. Pat. No. 5,337,479 (Ducret) discloses a hand-held wire and cable stripper which includes a first handle formed with a U shaped channel for sideways reception of a jacket covered cable, a second handle pivotally mounted to the first bracket and having a cutting blade which projects into the channel for stripping a jacket. The stripper further includes a leaf spring cooperating with the cutting blade by maintaining the length of the blade tip at its desired setting for precisely cutting the jacket.

U.S. Pat. No. 5,713,249 (Liversidge) discloses a wire stripper including a pair of clamping jaws and a pair of stripping jaws. The wire stripper further includes an actuator that defines a cam profile cooperating with clamping and stripping jaws to effect linear sliding movement thereof. The actuator provides a smooth cutting operation with a substantially constant velocity between the linear movement of the stripping jaws and angular displacement of the clamping jaws.

SUMMARY OF THE INVENTION

With a wire and cable stripper in accordance with the invention one can facilitate and speed up preparation of electrical and communication cables for subsequent electrical or fiber optic connections by setting a desirable length of a cable to be stripped and by bringing the cable toward a cutting blade that controllably penetrates the cable at a predetermined thickness.

This is achieved with one wire and cable stripper that includes a depth setting member having at least one scale indicating blade penetration. As a result of the manipulation of the depth setting member, the cutting blade advances at a distance corresponding to a predetermined thickness of penetration into a workpiece.

In accordance with still another aspect of the present invention, the wire and cable stripper has a length adjustment member carrying at least one measuring scale to accurately measure a distance between an end of the cable and the cutting blade while displacing the cable along the wire stripper. This distance corresponds to a desirable length of the cable's end to be stripped.

According to another aspect of the invention, the wire and cable stripper has a clamp for engaging a workpiece to enable the cable to slide along the stripper at the desirable length measured by the length adjustment member. Once this length has been reached, the clamp brings the cable towards the blade that penetrates into the cable at a depth set by the depth setting member.

In accordance with yet another aspect of the invention, a cutting blade has an eccentrically positioned cutting edge. The cutting blade freely spins about its axis to properly orient the cutting edge in response to the rotational and axial displacement of the cable and the stripper relative to each other. As a result, the cutting edge circumferentially cuts the cable during rotation of the cable and axially slices the cable upon pulling the cable and the stripper apart in a direction parallel to a longitudinal axis of the stripper.

It is, therefore, an object of the present invention to provide a wire and cable stripper capable of speeding up cable preparation for subsequent electrical and in fiber optic connections.

Another object of the present invention is to provide a wire and cable stripper, which has a length adjusting member for setting a desirable length of the cable to be stripped.

Yet another object of the present invention is to provide a wire and cable stripper, which includes a clamping member engaging a cable in a manner allowing the cable and the wire and cable stripper to move axially and rotatably relative each other.

Still another object of the present invention is to provide a wire and cable stripper, which has a depth setting member allowing easy adjustment of a cutting blade that penetrates a cable to be stripped at a desirable depth.

Still another object of the invention is to provide a wire and cable stripper with a cutting blade capable of orienting itself in a direction of a rotational thrust imparted on the cable.

Yet another object of the invention is to provide a wire and cable stripper with a cutting blade displaceable in a position wherein it is capable of producing a linear cut in an axial direction upon pulling the cable and the wire and cable stripper axially apart.

The invention and its particular features and advantages will become more readily apparent from the following detailed description when considered with reference to the accompanying drawings.

DETAILED DESCRIPTION OF THE DRAWINGS

Referring to FIGS. 1–4, a wire and cable stripper, sometimes referred to as a workpiece manipulating device, is shown and generally designated by numeral 10 and includes a hand-held handle 12 terminating at its opposite ends 16 and 18. It should be noted that the for the sake of clarity, the end 16 is referred to as an inner end and the end 18 as an outer end. Concomitantly, all end regions of all of the components of the workpiece manipulating device 10 pointing toward the inner end 16 are referred to as inner ends. Further, the components and parts of wire and cable stripper may not be shown and/or marked in all of the drawings.

Figures 1, 2, 3:
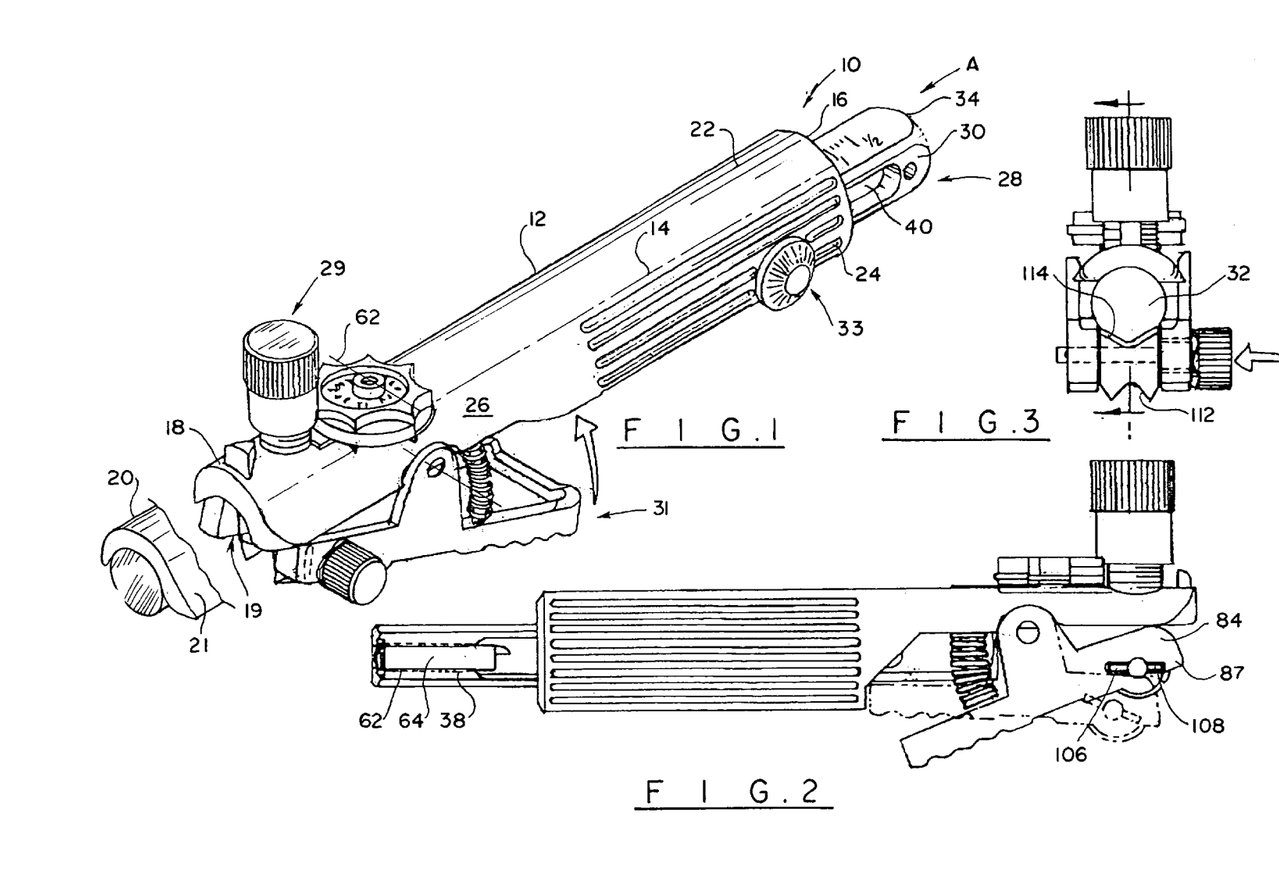
FIG. 1 is an isometric view of a wire and cable stripper, positioned on its side and constructed in accordance with the present invention, the wire and cable stripper comprising a handle, a cable clamp member, a depth setting member and a length adjusting member.
FIG. 2 is a side view of the wire and cable stripper of FIG. 1.
FIG. 3 is a front view of the wire and cable stripper shown in FIG. 1.

Wire and cable stripper device 10 may be in any of various orientations depending on how a user feels most comfortable in handling it. FIGS. 1 and 2 illustrate the wire and cable stripper in a relatively horizontal position that best illustrates its different components. It should be understood that, in order to perform a circumferential cut that the workpiece manipulating device 10 is capable of, one must rotate it at a 360° angle from, for example, a position shown in FIG. 1 to a position shown in FIG. 2. A cable can be placed in any angular position and inserted into the wire and cable stripper, as explained in detail hereinbelow.

Referring specifically to FIG. 1, the wire and cable stripper 10 is comprised of a length adjusting member 28 mounted to the inner end 16 of the hand-held handle 12 and adapted to measure a desirable length of an outer end 21 of a cable 20 which may slide through the outer end 18 of the hand-held handle 12. A depth setting member 29 serving to controllably adjust a distance at which a blade penetrates into the cable 20 is mounted on the outer end 18 of the hand-held handle 12. A cut-off portion 26 of the handle carries a workpiece clamp member 31 that engages the cable 20 upon its insertion in the hand-held handle 12 and after the predetermined length and depth of the cable to be cut have been set.

The hand-held handle 12 extends along a longitudinal axis 14 between the outer end 18 and the inner end 16 held by the user's hand. The inner end 16 has a tubular peripheral wall 22 defining an inner axial channel 32 open at opposite axial ends, as better seen in FIG. 3. The peripheral wall 22 has a grooved section 24 to improve the hand gripping while displacing the handle 12 and a cable 20 relative each other upon insertion of the cable in the wire and cable stripper 10. A cut-off portion 26 formed at the outer end 18 defines a cable seat 19 and is sized to allow access to the handle's interior from outside.

Figure 4:
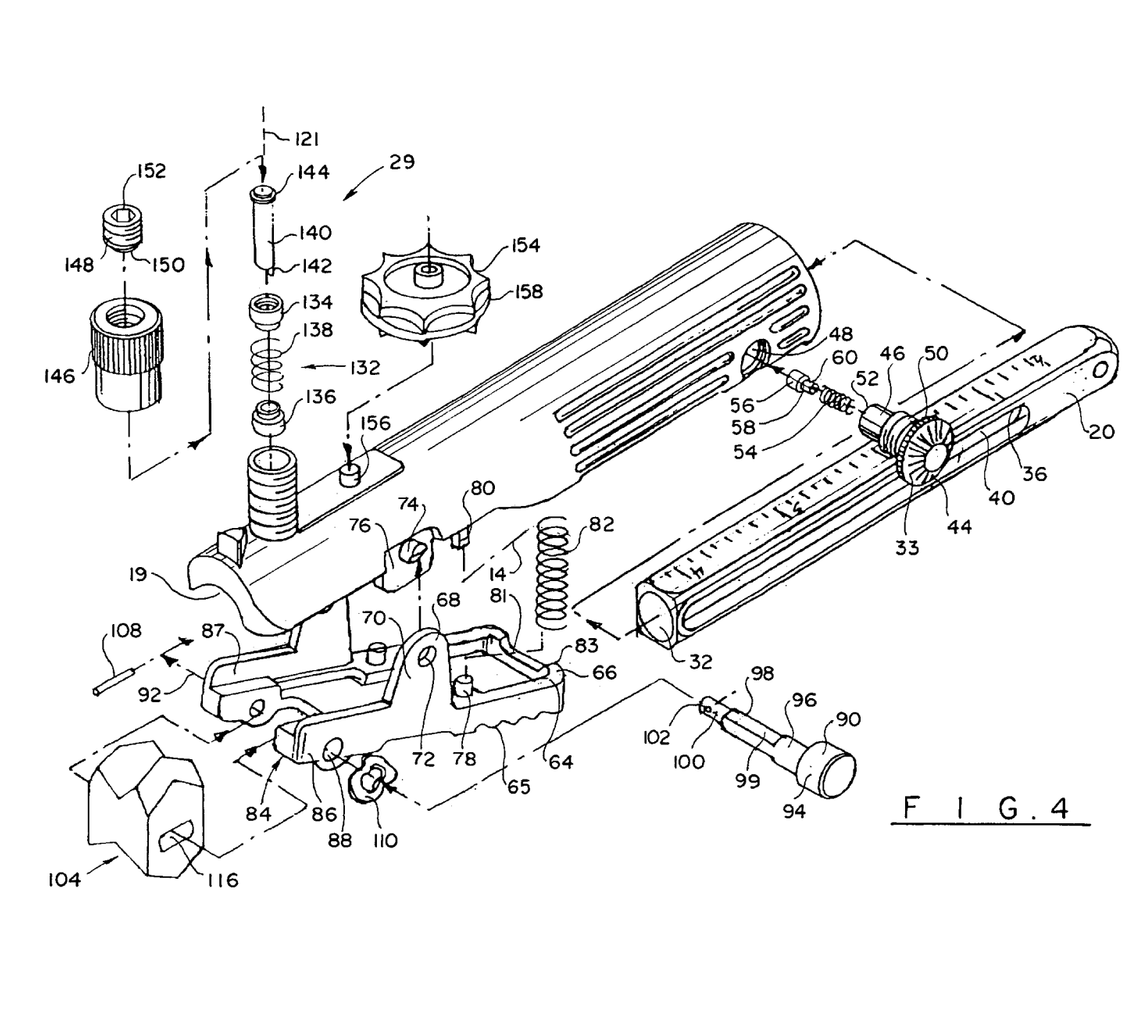
FIG. 4 is an exploded view of the wire and cable stripper of FIG. 1.

In accordance with one feature of the invention, the length adjusting member 28 includes a stop 30 slidably inserted in the axial channel 32 and a locking element 33 arresting axial displacement of the stop 30 in a desirable position. Upon applying an external force in a direction of arrow A the stop 30 is slidably displaceable towards the outer end 18 of the handle 12. An outer end 32 of the stop 30, better seen in FIG. 4, is shaped to abut the cable's inner end and forms a stop after a desirable axial length of the cable's end has been reached. The outer end 32 of the stop can be easily reached through the cut-off portion 26 from the outside. When the wire and cable stripper 10 does not receive the cable 20, the inner end 32 of the stop may reach its outer position close to a blade, as will be explained below. The stop 30 is preferably sized to have its inner end 34 to be positioned flush with the outer end 16 of the handle in the outer position of the stop. During the cable's axial displacement through the handle, the cable 20 is in contact with the outer end 32 of the stop thereby pushing the stop 30 towards its inner position at a distance corresponding to a predetermined length of the cable's end to be stripped off its jacket and possibly, in case of coaxial cables, insulation.

In order to provide an accurate measurement, the stop 30 has at least one scale 42, which is formed along the stop, as is shown in FIGS. 1 and 4. Preferably, two scales provided in metric and/or English (i.e.,) units are formed along opposite sides of the stop 30. A distance between a cutting edge 142 of a cutting blade 140 seen in FIG. 4 and the inner end 21 of the cable 20 is shown by the measuring scale 42 and corresponds to the predetermined length of the cable's inner end 21 to be processed.

The stop 30 further has a pair of elongated deep axial grooves 36 and 38 which are closed at opposite axial ends of the stop. The grooves are separated by an axial web 40 (FIGS. 1 and 4) spaced radially inwardly from the opposite sides of the stop and serving as a bottom for each of the grooves 36, 38. As illustrated in FIG. 2, the groove 38 advantageously carries a small pocket 62 where a spare blade 64 can be stored.

The locking element 33 as better seen in FIG. 4 includes a locking thumb screw 44 formed with a shank 46 which is threadedly received in an opening 48 of the grooved section 24 of the handle 12. A periphery 50 of the thumb screw 44 is textured for convenient use. The shank 46 is provided with a blind hole pocket 52 receiving a spring 54, which is press-fitted to a seat 58 of a tip 56 thereby forming a stop for the spring 54. The tip 56 is further formed with a pin 60 having a diameter which is smaller than a diameter of the tip 56 and which is inserted into the spring 54. Upon assembly of the locking element 33, the tip 56 extends over the shank 46 in an unloaded condition of the spring 54. After the locking element 33 has been threadedly inserted into the hole 48 the tip 56 extends into the groove 36. Once the desirable length of the cable's end 21 has been reached, the thumb screw 44 is rotated to advance the tip 56 radially towards the axial web 40. As a result, the tip 56 urges against the axial web 40 with some "drag" to allow additional fine adjustment of the stop 30 before displacement of the stop 30 is finally arrested.

If the predetermined length of the cable to be cut exceeds the entire length of the wire and cable stripper 10, the locking element 33 may be completely removed from the handle 12 to allow subsequent withdrawal of the stop 30 from the channel 32. As a result, the cable 20 may be displaced beyond the inner end 16 of the handle 12 at any desirable length.

FIGS. 1, 4 illustrate the stop 30 having a rectangular shape. However, it should be understood that any other shape may be easily implemented without departing from the scope of this invention. Although the inner end 16 of the handle 12 is shown to have an annular cross-section, any other cross-section is easily contemplated within the scope of the invention, provided, of course, that the inner channel 32 is both sized and shaped to guide the stop 30 axially along the wire and cable stripper 10.

In accordance with another feature of the invention, the workpiece clamp 31 is mounted pivotally to the outer end 18 of the handle 12 to swing about a pivot axis 62 between an open position shown in phantom lines in FIG. 2 and a clamping position illustrated in FIGS. 1–4. The open position of the workpiece clamp 31 defines a state of the wire and cable stripper 10 in which it is ready to receive the cable 20 that can slide towards the inner end 16 of the handle. In the clamping position, the workpiece clamp is swingably biased towards the outer end 18 to press the cable 20 against the cutting edge 142 of the cutting blade 140, as is explained in detail hereinbelow.

As illustrated in FIG. 4, the workpiece clamp 31 has a frame 64 formed with a base 66 that extends generally in a direction of the longitudinal axis 14 of the handle 12 and with a pair of parallel arms 68 that extend from and flank the base 66. Free ends 70 of the arms 68 are formed with holes 72 sized to snap over pins 74 that extend radially from lugs 76 recessed in the outer end 18 of the handle. The frame 64 is preferably made of a resilient polymer material so as to allow bending the arms slightly outwardly in order to journal the free ends 70 of arms on the pins 74 for pivotal displacement of the frame 64. An outer face 65 of the frame 64 is textured and has a plurality of grooves 67 to provide a non-slip surface when depressed with a finger.

The base 66 of the frame 64 has at least one guide pin 78 receiving one end of a compression spring 82 which has its opposite end braced against a guide pin 80 formed on the cut-off portion 26 of the handle and facing the guide pin 78. As a consequence, the compression spring 82 biases the workpiece clamp towards its clamping position, wherein an outer end 84 (FIG. 2) of the clamp urges against the outer end 18 of the handle 12. Preferably, two pairs of spaced apart pins 78 and 80 are provided each receiving its compression spring 82, as is shown in FIG. 2. The springs are selected to generate a spring force sufficient to enable the cutting edge 142 of the cutting blade to penetrate the cable 20 in the clamping position of the workpiece clamp 31.

Turning again to FIG. 4, an inner end 83 of the base 66 has a U-shaped channel 81 guiding the cable 20 along the longitudinal axis 14 of the wire and cable stripper 10. The outer end 84 of the base 66 is recessed to have a pair of supports 86, 87 formed with coaxial holes 88 that receive a shaft 90 that extends along a shaft axis 92. The shaft 90 includes a knurled flange 94 and a shank 96 having a cutoff portion 98 and an end portion 100. The cutoff portion 98 is machined to have generally a rectangular cross section so as to form a plurality of angularly spaced flat faces 99 providing support surfaces for a cable support element 104 as will be explained in detail herebelow. The end portion 100 of the shaft 90 has a cylindrical shape and extends through the holes 88 of the supports 86, 87.

The shaft 90 is sized to have the knurled flange 94 and the end portion 100 spaced laterally outwardly along the shaft axis 92 from the supports 86, 87 and to rotate about this axis upon assembly of the workpiece clamp 31. In order to arrest angular displacement of the shaft 90, FIG. 2 shows the support 87 having a nest 106 that receives a pin 108. As shown on FIG. 4, the end portion 100 of the shaft 90 has a channel 102 traversed by the pin 108 which, upon angular displacement of the shaft 90, may be aligned with the nest 106. In order to have the pin 108 biased against the nest 106, the shaft has a bowed spring 110 (FIG. 4) mounted on the shaft 90 between the support 86 and the knurled flange 94 of this shaft. Upon depressing the knurled flange 94 towards the support 87, the shaft is axially displaced to dislodge the pin 108 from the nest 106 thereby allowing further rotational movement of the shaft.

The cable support element 104 shown in FIGS. 3 and 4 is formed with a pair of grooves 112, 114 having different depths and shaped to receive differently sized cables. The cable support element 104 has a cross channel 116 (FIG. 4) having generally a rectangular cross-section to engage the flat faces 99 of the shaft 90. Such engagement enables the cable support element 104 to rotate with the shaft 90, so as to bring one of the grooves 112, 114 in a position, wherein a bottom of the groove is substantially aligned with the cutting edge 142 of the cutting blade 140 in the clamping position of the workpiece clamp 31. It is easy to surmise that when the cable 20 is clamped by the cable support element 104, it is pressed against the cutting edge with the spring force exerted by a pair of springs 82, which, as has been mentioned before, is sufficient to enable the cutting edge to penetrate the cable.

As shown in FIGS. 3 and 4, the grooves 112 and 114 have generally a V cross section and are sized to allow the cable 20 to be frictionally engaged by the grooves' flanks 116, 118 (FIG. 3) enabling the cable to rotate and axially move relative to the handle 12 upon sequentially applying rotational and axial thrusts to produce circumferential and axial cuts respectively.

The number of grooves and their shape may vary without departing from the scope of the invention. For example, it is possible to have grooves formed with curved bottoms and flanks. By adding another nest to the support 87, it is possible to implement a four-grooved cable support element which is preferably made of a polymer material.

Figures 5, 6, 7, 8:
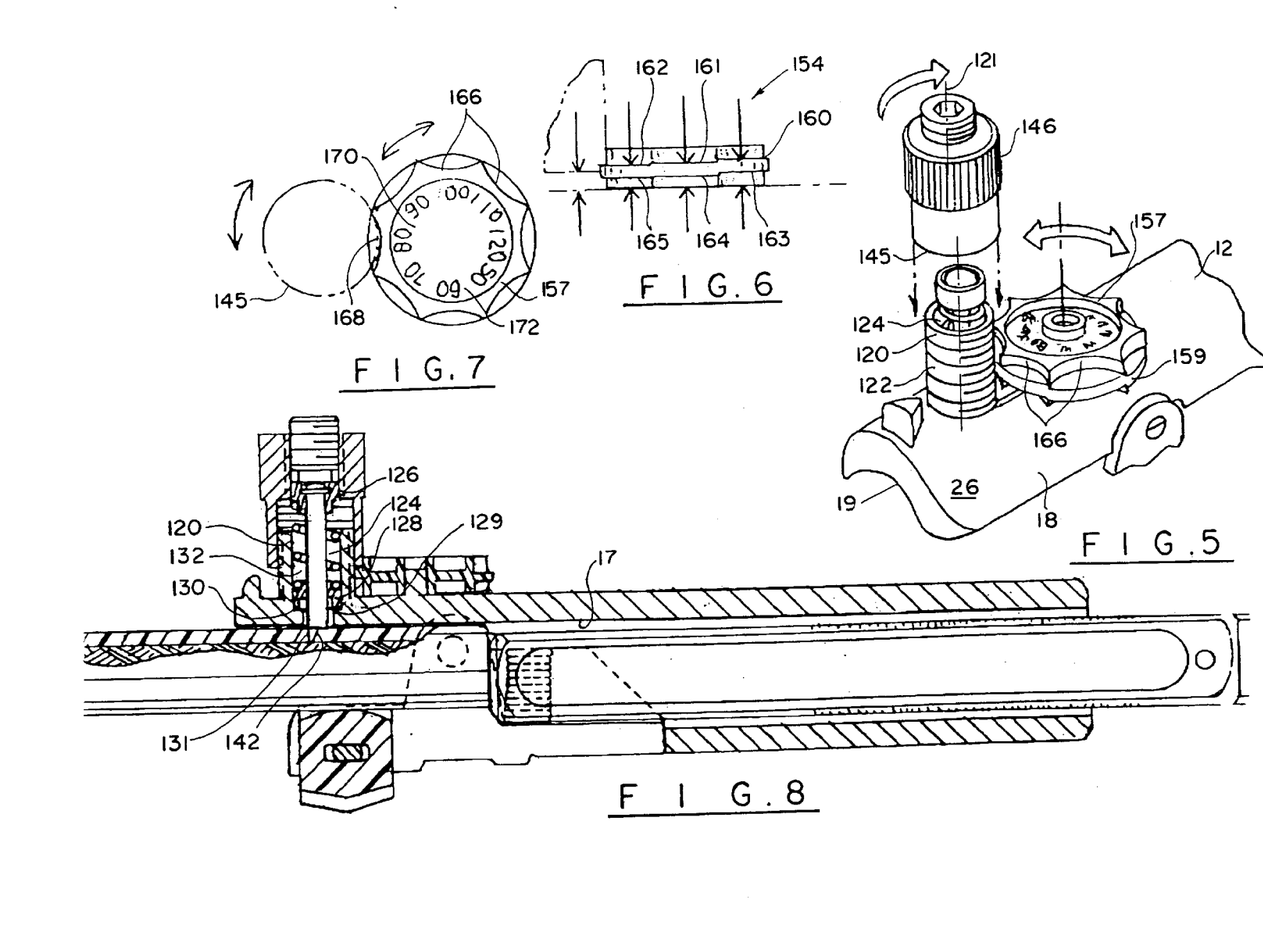
FIG. 5 is an isometric view of the depth setting member according to one embodiment of the invention.
FIG. 6 is a side cross-sectional view of a cam of the depth setting member shown in FIG. 5.
FIG. 7 is a top view of the cam of the depth setting member shown in FIGS. 5 and 6.
FIG. 8 is a cross-sectional view of the wire and cable stripper taken along lines VIII—VIII of FIG. 2 and shown with the depth setting member of FIG. 5.

Referring to FIGS. 4–8, the depth setting member 29 according to another feature of the invention is shown in detail. As illustrated in FIG. 5, the outer end 18 of the handle 12 has a guide 120 extending therefrom along an axis 121 and formed with a threaded periphery 122. An inner channel 124 defined by the threaded periphery 122 has open opposite ends 126, 128 better seen in FIGS. 8 and 10, so as the inner end 128 points toward the cable seat 19 of the handle 12. Completing the inner channel 124 is a narrow axial groove 131 opening onto the tool 19 and receiving the cutting edge 142 of the blade 140, which, in turn, is slidably guided in a precision ball bearing assembly 130 illustrated in and explained in reference to FIGS. 10 and 11.

Turning now to FIG. 4, the depth setting member 29 includes a blade assembly 132 that is comprised of two bushings 134, 136 preferably made of bronze and press fitted on each end of a spring 138. The blade assembly further has the cutting blade 140 traversing the inner channel 124 and having the cutting edge 142. The cutting blade 140 has a groove receiving a "C" ring 144 extending radially outwardly and pressing upon an interior of the bushing 134 to hold the cutting blade captive inside this bushing.

As shown in FIG. 8, during placement of the blade assembly 132 in the guide 120, the bushing 136 forms a seat for the inner end of the spring 138 thereby serving as a stop for the blade assembly. Having this construction, only the cutting edge 142 extends into the groove 131. Referring to FIG. 4, the blade assembly is completed with a threaded cap 146 removably screwed onto the guide 120 and receiving a set screw 148 which threadedly engages the cap's interior. The threaded cap 146 holds the set screw with a nylon patch to prevent it from loosening during operation of the wire and cable stripper 10. The spring 138 biases the bushing 134 against a guide portion 150 of the set screw 148 during axial displacement of the threaded cap along the axis 121 toward and away from the workpiece seat 19. As the cutting blade 140 moves toward the workpiece seat 19, the set screw 148 guides the blade assembly 132. In order to compensate for wear of the blade or simply to reset the blade to a zero blade penetration, the set screw positions the cutting edge 142 flush with an inner surface 17 of the outer end 18 of the handle 10. A recessed head 152 accessible from outside receives tools for actuating displacement of the set screw.

As shown in FIGS. 4,5 and 8 the depth setting member 29 further includes a notched cam 154 which can be rotated over a pin 156 protruding from the handle 12. FIG. 5 illustrates the notched cam 154 including a cam surface 158 which has its periphery 159 rotatable in a plane radially adjacent to the guide 120. The cam surface 158 further has opposite faces 157 formed with a plurality of angularly spaced circular notches 160–162 on one of the faces and 163–165 on the opposite face as shown in FIG. 6. Each notch has a different height corresponding to the desirable blade penetration into the workpiece seat 19. In order to set this desirable blade penetration, the notched cam is rotated until a selected one of the notches is aligned with and faces the axial guide 120. After the notched cam has been properly positioned, the threaded cap 146 is guided axially toward the cable seat 19 until a portion 145 of the threaded cap 146 comes in contact with the cam face 157. As a result, further axial displacement of the blade assembly 132 is stopped in a position, in which the cutting edge 142 penetrates into the circumference of the cable 20 at a desirable depth. The notched cam 154 may be reversed to have the opposite face 157, which is formed with notches 163–165, face the portion 145 of the threaded cap 146 to give additional depth of cut settings.

As seen in FIG. 7, the notched cam 154 further has a plurality of peripheral walls 166 each defining a respective one of the notches 160–162 to ensure a proper angular position of the threaded cap 146 with respect to the notched cam. Each of these walls 166 is sized to be adjacent to a segment 168 of the portion 145 of the threaded cap that comes into contact with the notched cam 154 upon reaching a desirable axial position of the blade assembly 132. Rotational displacement of the notched cam 154 is arrested in this desirable axial position by further tightening the threaded cap 146 on the face 157 of the notched cam 154.

FIG. 7 further illustrates a central groove 170 of the notched cam 154 which is used to receive different doughnut shaped labels showing metric or inch blade penetration scale 172. If the user would like to customize the notched cam, the labels may, for instance, indicate the cable manufacturer's number and insert the customized label in a respective notch. This embodiment of the depth setting member 29 allows the user a great flexibility with the great advantage of operatively setting the tool for the proper cable with the insurance of complete repeatability. It also allows the user to eliminate the risk of costly errors when an improper setting can damage the core of a cable.

Figures 9, 10, 11, 12, 13:
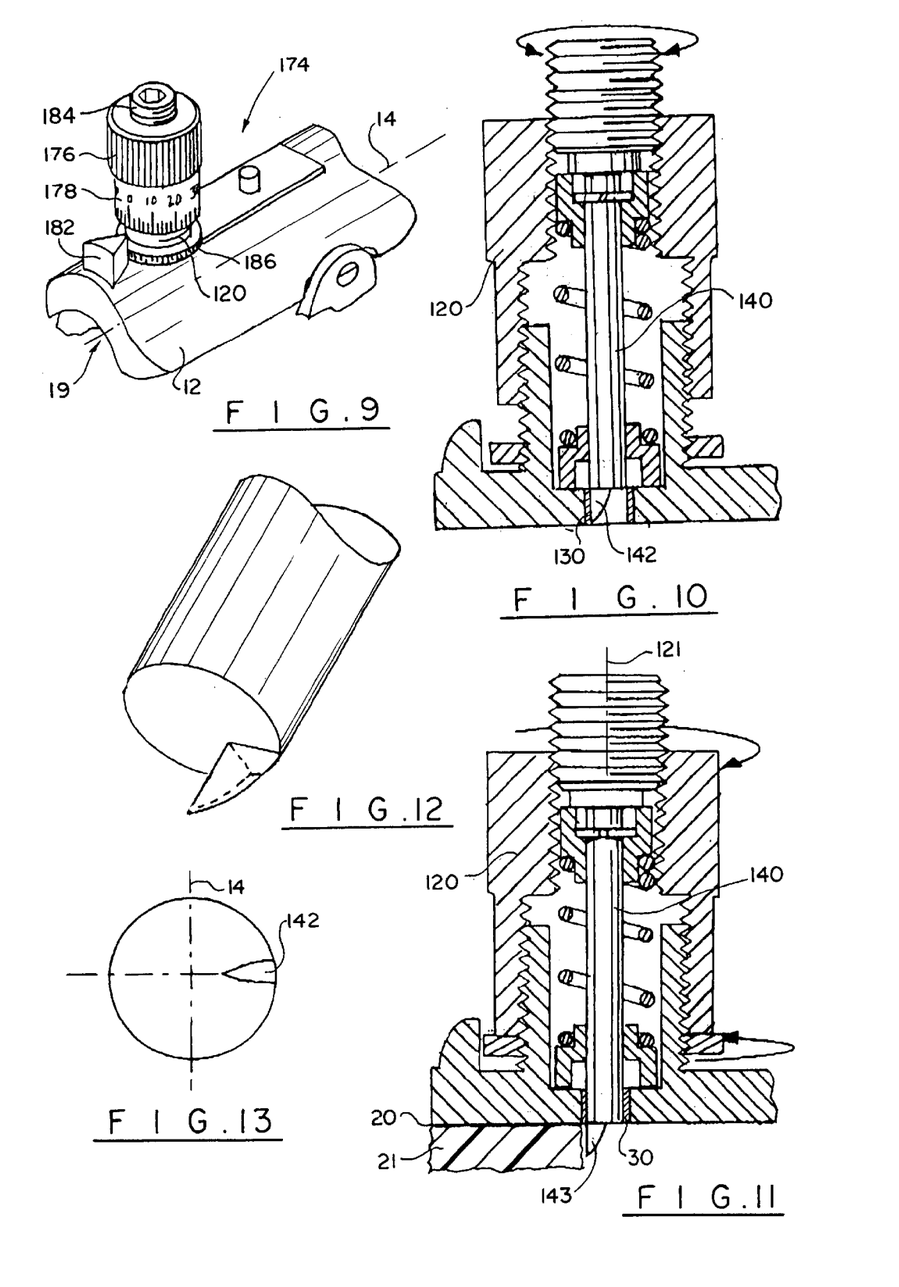
FIG. 9 is an isometric view of the depth setting member according to another embodiment of the invention.
FIG. 10 is a cross sectional view of a cutting blade in its rest position taken along a longitudinal axis of the cutting blade.
FIG. 11 is a cross sectional view of the cutting blade if FIG. 10 in its cutting position.
FIG. 12 is a diagrammatic view illustrating a circumferentially severed portion of a cable.
FIG. 13 is a diagrammatic illustration of a cutting edge of the cutting blade.

FIGS. 9–11 illustrate another embodiment of a depth setting member 174 including a threaded cap 176, which is threadedly mounted on the guide 120 in a manner discussed hereinabove. The threaded cap 176 has an engraved scale 178 formed on a portion 180 of the threaded cap which faces the handle 12. In order to set a desirable depth of the blade penetration, the threaded cap 176 is brought to a level on which a zero mark of the engraved scale 178 faces an indicator 182. In this position, the user may displace the cutting edge 142 (FIG. 10) adjacent to the inner axial surface 17 of the outer end 18 of the handle 12 by manipulating the set screw 184, so as the blade's position properly corresponds to the zero blade penetration. After having reached the zero blade penetration, the user sets the desirable blade penetration by rotating the threaded cap 176. Finally, bringing a knurled lock nut 186 in locking engagement with the portion 180 arrests further voluntary rotation of the threaded cap 176 and allows relative displacement of the blade and the cable.

As has been mentioned with respect to FIG. 8, the precision ball bearing assembly 130 slidably supports the blade 140. Illustrated in detail in FIG. 11, the ball bearing assembly 130 is mounted to an inner annular wall 139 of the channel 124 and extends radially inwardly. As a consequence, an inner radial race 141 of the bearing assembly slidably guides the blade 140, so as to allow it to be freely rotatable relative to the guide 120 while being continuously centered along the axis 121. An inner axial race of the bearing assembly is supported by an annular seat 129 formed in the inner axial end 128 of the channel 124, while an upper axial race of the bearing assembly forms a support for the bearing 136.

It should be noted that both embodiments of the depth setting members 29 and 174 are interchangeable and the user according to the circumstances can easily use either.

As has been described hereinabove, the cutting edge 142 has a flat cutting portion 143 that extends generally in a plane extending radially of the axis 121. This particular structure of the cutting edge represents another feature of the invention. As shown in FIG. 11 the cutting edge after the predetermined depth of blade penetration and the predetermined length of the cable's inner end 21 have been set, extends into the cable 20. The blade 140 is mounted in the guide 120 to rotate therewith about the longitudinal axis 14 (FIG. 9) of the wire and cable stripper 10 (FIGS. 1 and 13) upon applying a rotational torque to the cable 20. Because the blade 140 freely spins about the axis 121 of the blade assembly 132 and because of the eccentricity of the cutting flat portion 143, the flat cutting portion 143 will orient itself in a plane extending perpendicular to the longitudinal axis 14 of the wire and cable stripper 10. Such orientation of the cutting edge 142 will result in a ring cut as shown in FIG. 12.

Figure 14A:
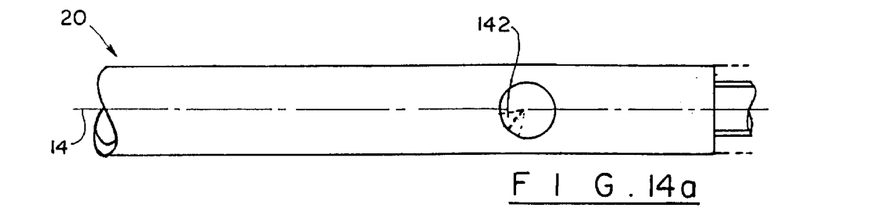
FIGS. 14A–14C is a diagrammatic illustration of a ring cut produced by the cutting edge of the cutting blade.
Figure 14B:
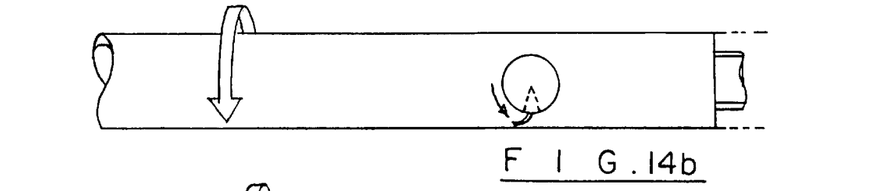
Figure 14C:
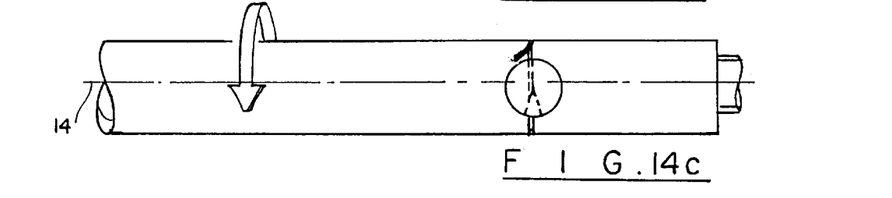

FIGS. 14A illustrates an initial position of the cutting edge 142 immediately after the penetration into the cable 20 at the predetermined depth. As is seen in this Figure, the cutting edge occupies a position in which it extends towards the longitudinal axis 14 at an angle different from a right angle. As explained above, in response to the rotational torque, the blade 140 is able to rotate on itself due to the adjunction of the precision ball bearing 130 made of material with a low friction coefficient. As a result of further angular displacement of the cable 20, the cutting edge 142 assumes a desirable cutting position shown in FIG. 14B and, after rotating the cable at a 360° angle, the desirable ring cut of the cable is produced, as shown in FIG. 14C.

Figure 14D:
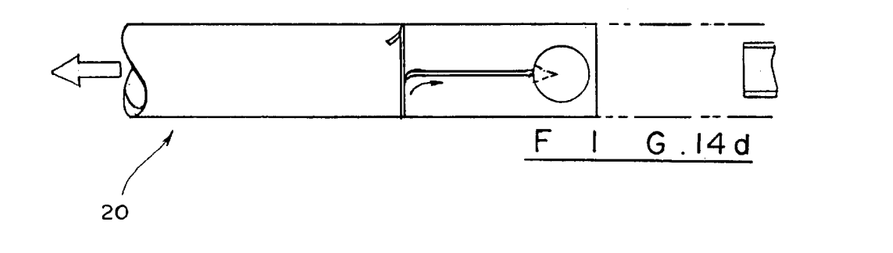
FIG. 14D is a diagrammatic illustration of a longitudinal cut by the cutting edge of the cutting blade.
Figure 15:
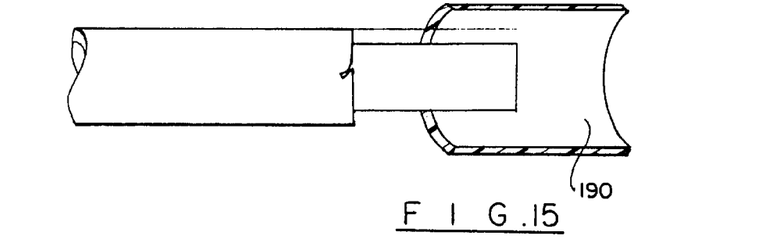
FIG. 15 is a view of the cable and a portion of the cable's jacket severed according to the invention.

FIG. 14D illustrates a position of the cutting edge 142 when it rotates in response to applying a torque to the cable 20 in a direction parallel to the longitudinal axis 14. As a result, the cutting edge 142 is able to slit the cable 20 along this longitudinal axis 14 to finally strip the cable 14 off a jacket 190, as illustrated in FIG. 15.

It should be understood that the foregoing is illustrative and not limiting and that obvious modifications may be made by those skilled in the art without departing from the scope of the invention recited in the accompanying claims.

What is claimed is:

1. A device for manipulating a workpiece selected from the group consisting of wires and cables, said device comprising:

a handle having a longitudinal axis defining a seat receiving a workpiece;

a guide opening toward the seat and mounted on the handle to extend therefrom along a guide axis transverse to the longitudinal axis;

a blade received in the guide to rotate therewith about the longitudinal axis, the blade spinning freely about the guide axis and controllably projecting from the guide into the seat at a predetermined depth;

a clamp for engaging the workpiece, the clamp being pivotally mounted on the handle to swing between an open position and a closed position about a clamp axis extending perpendicular to the longitudinal and guide axes, wherein the clamp presses the workpiece in the seat against the blade to enable it to penetrate the workpiece at the predetermined depth, the clamp being sized to enable the workpiece and the handle to rotate and to axially move relative each other upon applying radial and axial external thrusts respectively.

2. The device defined in claim 1 wherein the blade rotates about a blade axis radially offset with respect to the guide axis, the blade spinning between a first angular position, wherein a cutting edge of the blade extends transverse to the longitudinal axis to circumferentially cut the workpiece during relative rotation of the workpiece and the handle, and a second angular position, wherein the cutting edge spins about the guide axis to extend parallel to the longitudinal axis to slit the workpiece along the longitudinal axis upon relative displacement of the handle and workpiece away from each other.

3. The device defined in claim 1 wherein the clamp includes a frame having an inner end and an outer end, the outer end being swung away from an outer end of the handle in the open position of the clamp to form a passage receiving the workpiece, the outer end urging against the handle in the closed position of the clamp.

4. The device defined in claim 3 wherein the frame of the workpiece clamp has a base extending generally in a direction of the longitudinal axis and a pair of spaced apart parallel arms formed between inner and outer ends of the frame and extending from the base to pivotally engage the handle.

5. The device defined in claim 4 wherein the frame further includes a bias element provided with a pair of spaced apart compression springs, which are braced against the inner end of the frame and the handle, to resiliently urge the frame to its closed position.

6. A device for manipulating a workpiece selected from the group consisting of wires and cables, said device comprising:

a handle having a longitudinal axis defining a seat receiving a workpiece;

a guide opening toward the seat and mounted on the handle to extend therefrom along a guide axis transverse to the longitudinal axis;

a blade received in the guide to rotate therewith about the longitudinal axis, the blade freely spinning about the guide axis and controllably projecting from the guide into the seat at a predetermined depth; and a clamp for engaging the workpiece pivotally mounted on the handle to swing between an open position and a closed position, the clamp being sized to enable the workpiece and the handle to rotate and to axially move relative each other upon applying radial and axial external thrusts respectively, the clamp having inner and outer ends, the outer end being swung away from the handle in the opening position of the clamp to form a passage receiving the workpiece and urging against the handle in the closed position of the clamp, a pair of spaced apart longitudinal arms extending between the inner and outer ends, and a pair of spaced apart compression springs braced against the inner end of the clamp and the handle to resiliently urge clamp to its closed position.

7. The device defined in claim 3 wherein the outer end of the frame is recessed to form a pair of spaced apart supports, the clamp further comprising a shaft rotatably mounted on the supports to rotate about a shaft axis extending perpendicular to the longitudinal and guide axes and a vee grooved element juxtaposed with the seat of the handle and fixedly mounted on the shaft to rotate therewith between multiple angular positions.

8. The device defined in claim 7 wherein the vee grooved element has a plurality of angularly spaced apart peripheral grooves, each of which is substantially aligned with the flat cutting edge of the blade in a respective angular position of the vee grooved element upon swinging the clamp in its closed position.

9. The device defined in claim 8 wherein the vee grooved element is made of a polymer material to provide frictional engagement with the workpiece in the closed position of the clamp, each of the grooves of the vee grooved element having generally a V or U shape.

10. The device defined in claim 7 wherein the shaft extends laterally outwardly from the supports and is slidable therebetween, wherein one end of the shaft has a shank spaced from a respective support and another end of the shaft has a pin extending through the shaft to nest in a cavity formed in the other end of the shaft for arresting rotation of the shaft.

11. The device defined in claim 10 wherein the clamp further comprises a bowed spring washer braced between the support and the shank to bias the shaft laterally outwardly, whereby the pin disengages the cavity after the shank has been depressed upon to overcome an outward biasing force of the bowed spring washer to provide rotation of the shaft.

12. The device defined in claim 4 wherein the handle further has a pair of protrusions extending laterally therefrom, the arms having free ends snapping over the protrusions to provide pivotal engagement between the frame and the handle.

13. The device defined in claim 4 wherein the base is made of a polymer material and has a textured outer face to provide a non-slip surface when depressed with a finger.

14. A device for manipulating a workpiece selected from the group consisting of wires and cables, said device comprising:

a handle having a longitudinal axis and defining a workpiece seat;

a blade having a blade axis transverse to the longitudinal axis, the blade controllably projecting into the seat at a predetermined depth;

a clamp mounted on the handle and engageable with the workpiece in the seat for pressing the workpiece against the blade to enable it to penetrate the workpiece at a predetermined depth;

a stop mounted displaceably in the handle and shaped to abut the workpiece to reciprocally move therewith along the longitudinal axis between an inner position relatively close to said blade and an outer position relatively remote from blade; and a locking element removably mounted on the handle and displaceable perpendicular to the longitudinal axis towards an arresting position, wherein said the locking element urges against the stop at any of a plurality of axial positions in and between its inner and outer positions, so as to set a predetermined length of the workpiece to be stripped.

15. The device defined in claim 14 wherein the handle has an inner tubular end defining an inner passage and an outer end of the handle having an axial cut-off portion to provide access to the stop.

16. The device defined in claim 14 wherein the stop has an elongated body formed with a measuring scale to provide an accurate measurement between the blade and an inner end of the workpiece abutted by the stop which corresponds to the predetermined length of the inner end of the workpiece to be stripped.

17. The device defined in claim 16 wherein the measuring scale includes a metric and inch scale extending along opposite axial sides of the stop.

18. The device defined in claim 15 wherein the body of the stop has an axial groove cooperating with the locking element and formed with a bottom, whereby the locking element is displaceable radially inwardly to lockingly press against the bottom of the groove in a predetermined one of the axial positions of the stop.

19. The device defined in claim 18 wherein the body has another axial groove extending radially from the bottom and formed with a pocket for storing a spare blade.

20. The device defined in claim 14 wherein the locking element is a thumb screw having an elongated shank, the shank having an inner pocket and a spring loaded tip received in the inner pocket.

21. The device defined in claim 20 wherein the spring loaded tip includes a spring and a pin biased toward the stop to give drag while adjusting the stop in a predetermined one of its axial positions.

22. The device defined in claim 14, further comprising a guide formed on the handle and extending therefrom for receiving the blade, the blade having a flat cutting edge lying in a plane that extends radially of the blade axis, the blade being rotatable with the guide about the longitudinal axis but freely spinning about the blade axis.

23. The device defined in claim 22, wherein the flat cutting edge spinning between a first angular position, wherein it cuts the workpiece circumferentially upon rotational displacement of the handle relative to the workpiece, and the second angular position, wherein the cutting edge slits the workpiece parallel to the longitudinal axis upon axially displacing the handle relative to the workpiece.

24. A device for manipulating a workpiece selected from the group consisting of wires and cables, said device comprising:

a handle defining a seat for receiving a workpiece and extending along a longitudinal axis;

a guide opening toward the seat and mounted on the handle to extend therefrom along a guide axis transverse to the longitudinal axis;

a blade mounted rotatably in the guide to freely spin about the guide axis and having a substantially flat cutting edge lying generally in a plane that extends radially of the guide axis;

a depth setting member mounted on the handle and controllably actuatable to set a predetermined distance at which the cutting edge penetrates into the workpiece, the depth setting member being connected to and displacing the blade along the guide axis at the predetermined distance; and a clamp for pressing the workpiece in the seat against the flat cutting edge to enable the flat cutting edge to penetrate into the workpiece at the predetermined distance, the flat cutting edge extending substantially perpendicular to the longitudinal axis to circumferentially cut the workpiece when the handle and the workpiece rotate relative each other, the flat cutting edge spinning about the guide axis to extend parallel to the longitudinal axis to slice the workpiece parallel to the longitudinal axis upon pulling the workpiece and handle apart along the longitudinal axis.

25. The device defined in claim 24 wherein the handle has a precision ball bearing formed between the seat and the guide and coaxial therewith, the bearing ball being sized to align the blade along the guide axis.

26. The device defined in claim 25, further comprising:

a first and second cupped bushing removably mounted in the guide and having open ends, wherein the first bushing presses against the precision ball bearing and the second bushing is in contact with the depth setting member;

a spring terminating at its opposite ends press fitted on the capped bushings and receiving the blade that extends between the capped bushings.

27. The device defined in claim 26 wherein the blade has a groove and a ring fitted in the groove and extending radially outwardly to press against the second cupped bushing, so as the blade and second cupped bushing are capable of moving along the guide axis toward the seat upon overcoming a spring force.

28. The device defined in claim 24 wherein the depth setting member includes:

a cam wheel mounted on the handle and rotatable about a wheel axis parallel to the guide axis and spaced therefrom along the longitudinal axis, the cam wheel having a first face formed with a plurality of cam seats of different depths corresponding to predetermined distances at which the flat cutting edge may penetrate into the seat, and a cap threaded on the guide and being in contact with the blade while bearing toward the seat along the guide axis, the cap having a portion facing the cam and fittable in each of the cam seats, so that the cap is prevented from further displacement along the guide axis in a position corresponding to the predetermined distance at which the cutting edge has penetrated the workpiece.

29. The device defined in claim 28 wherein the depth setting member has a set screw extending into the cap to actuate the second cupped bushing for positioning the flat cutting edge of the blade adjacent to the seat before and after cutting the work piece.

30. The device defined in claim 28 wherein each of the cam seats receives a label shaped to fit the cam seat and showing metric or inch blade penetration.

31. The device defined in claim 28 wherein the cam has a second face facing away from the first face and having a plurality of cam seats with different depths.

32. The device defined in claim 28 wherein the handle is formed with a pin extending along the wheel axis, the cam having a central opening receiving the pin, so that the cam may be reversibly mounted on the pin.

33. The device defined in claim 24 wherein the depth setting member includes:

a cap displaceably mounted on the guide to move axially along the guide axis and pressing upon the blade, and a nut mounted rotatably on the guide between the handle and the cap to rotate in a locking position, wherein the nut is urged against the cap for arresting further displacement of the nut when the flat cutting edge has penetrated into the workpiece at the predetermined distance.

34. The device defined in claim 33 wherein the cap has an engraved scale setting the predetermined distance at which the flat cutting edge has to penetrate the workpiece.

* * * * *